(12) United States Patent
Daoud et al.

(10) Patent No.: US 6,535,681 B2
(45) Date of Patent: Mar. 18, 2003

(54) FIBER-OPTIC CABLE ROUTING AND BEND LIMITING DEVICE AND SYSTEM

(75) Inventors: Bassel Hage Daoud, Parsippany, NJ (US); Ivan Pawlenko, Holland, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/884,524

(22) Filed: Jun. 19, 2001

(65) Prior Publication Data

US 2002/0191936 A1 Dec. 19, 2002

(51) Int. Cl.[7] .................................................. G02B 6/00
(52) U.S. Cl. ...................................... 385/134; 385/135
(58) Field of Search ............................... 385/88, 89, 92, 385/93, 134–137, 147

(56) References Cited

U.S. PATENT DOCUMENTS

| | | | | |
|---|---|---|---|---|
| 5,249,252 A | * | 9/1993 | Noto | 385/135 |
| 5,394,502 A | * | 2/1995 | Caron | 385/134 |
| 6,056,245 A | * | 5/2000 | White | 248/58 |
| 6,321,017 B1 | * | 11/2001 | Janus et al. | 385/134 |

* cited by examiner

*Primary Examiner*—Khiem Nguyen

(57) ABSTRACT

A fiber-optic cable routing and bend limiting device and system that can be used to route fiber-optic cable, or other types of cable, to various locations within a room or a building structure, and into and out of electronic equipment enclosures and cabinets, without risk of damage to the cable. The device and system enable routing of fiber-optic (or other types) cables in any direction within a 360° radius without pinching or cutting the cable.

11 Claims, 4 Drawing Sheets

FIBER-OPTIC CABLE ROUTING AND BEND LIMITING DEVICE AND SYSTEM

BACKGROUND OF THE INVENTION

1. Field of the Invention

The present invention relates to a fiber-optic cable routing and bend limiting device and system.

2. Background of the Invention

In the telecommunications industry, fiber-optic cables are often routed through rooms and buildings using ceiling-mounted or overhead cable routing systems. Such cable routing systems may be used to provide overhead cable routing between and among the various communication equipment in a data processing center, central office, telecommunications room, and the like (generally referred to herein as an "equipment room"). A typical component of such overhead routing systems is a segmented aluminum trough that may be manufactured in short segments that may be pieced together to form all or part of the overhead cable routing system. To facilitate routing of a fiber-optic cable from the aluminum trough to the equipment below, an end of the trough may be bent. However, bending the end of the trough may form sharp edges and v-shaped channels that each may increase the likelihood of damage to the fiber-optic cables. Obviously, damage to the cables may lead to failure of the cable and unnecessary expense and maintenance.

Routing fiber-optic cables into and out of electronic equipment enclosures presents problems similar to those just described. The bend radius of the fiber-optic cable as it passes into or out of the enclosure must be maintained at a predetermined minimum. In addition, sharp edges at the ingress/egress location can lead to damage and failure of the fiber-optic cables.

It is therefore desirable to provide a fiber-optic cable routing and bend limiting device and system that overcomes the above-described shortcomings of the prior art

SUMMARY OF THE INVENTION

The present invention is directed to a fiber-optic cable routing and bend limiting device and system that can be used to route fiber-optic cable, or other types of cable, to various locations within a room or a building structure, and into and out of electronic equipment enclosures and cabinets, without risk of damage to the cable. The device and system of the present invention will enable routing of fiber-optic (or other types) cables in any direction within a 360° radius without pinching or cutting the cable.

In accordance with an embodiment of the present invention, a bend limiting device comprises a generally funnel-shaped structure having smooth outer and inner walls over which a fiber-optic cable may be routed without risk of damage to the cable. A routing channel is defined longitudinally through the cable routing and bend limiting device through which one or more fiber-optic cables may be directed. The bend limiting device may be used together with a support or cable trough through which one or more fiber-optic cables may be routed. The combination of the bend limiting device and cable trough provides a fiber-optic cable routing system capable of carrying a plurality of fiber-optic cables and routing those cables to a plurality of electronic equipment without risk of damage to the fiber-optic cables and ensuring that the cables do not bend more than predetermined amount.

In an alternative embodiment of the present invention, a fiber-optic cable routing and bend limiting device may be used in connection with an electronic enclosure to provide a smooth path over which fiber-optic cables may be routed into and out of the enclosure. Two fiber-optic cable routing and bend limiting devices constructed in accordance with the present invention may be used together (one inside and one outside of the enclosure) to provide a smooth transition for routing of fiber-optic cables both inside and outside of the enclosure.

The present invention offers benefits over prior art fiber-optic cable routing devices and systems. For example, present cable troughs are generally constructed of aluminum and are formed into various shapes to accomplish bend limiting features. However, in accomplishing those features using a single piece of aluminum, sharp edges and v-shaped openings are formed in the aluminum which tend to pinch or cut the various cables. The present invention offers a cable routing path that is smooth and continuous with customizable cable trough sizes having curved surfaces and bend limiting features.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

The present invention is directed to a fiber-optic cable routing and bend limiting device and system. The device is generally funnel-shaped with smooth and continuous outer and inner walls. A fiber-optic cable may be routed over and along either or both of the outer and inner walls without risk of damage to the cable from sharp edges or bending beyond a predetermined bend radius. A first cable routing path is defined, at least in part, by the outer wall and a second cable routing path is defined, at least in part, by the inner wall. A routing channel is defined through the device and bounded by the inner wall. A fiber-optic cable may be routed on and along the outer wall and the inner wall, may pass through the routing channel as the fiber-optic cable is routed from an overhead routing system, or into and out of an electronic equipment enclosure. The device includes certain mounting and alignment features that facilitate mounting of one device to another device, and that also facilitate mounting of one or more devices to another structure (e.g., a trough or enclosure, as described below).

The system of the present invention comprises one cable routing and bend limiting device and a cable trough having a plurality of user-selectable locations at which the device may be mounted. The device includes certain locking features that are complementary with certain features of the trough. For example, the device includes releasable locking tabs that are sized and shaped to releasably secure the device in an aperture defined through the trough at one of the plurality of user-selectable mounting locations. The device may thus be snapped in place at a user-selectable location to facilitate routing of a fiber-optic cable from the inventive system to an electronic equipment enclosure.

As used herein, the term "enclosure" is intended to be broadly construed and to refer to any type of structure that may be used to house or mount electronic equipment.

Figure 1:
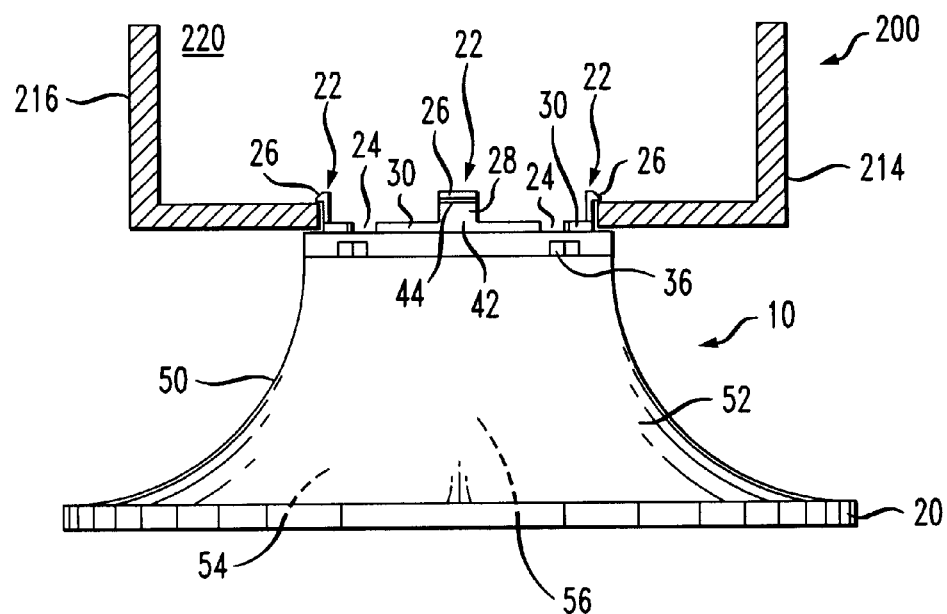
FIG. 1 is a partial cross-sectional side view of a fiber-optic cable routing and bend limiting system constructed in accordance with an embodiment of the present invention.

Referring now to the drawings in detail, the various embodiments of the present invention will now be discussed. With reference first to FIG. 1, a fiber-optic cable routing and bend limiting device, generally designated as 10, is depicted secured to a cable trough 200, shown in partial cross-section, and discussed in more detail below. The device 10 is generally funnel shaped, and comprised of a body 50 having a generally continuous and smooth outer wall 52 over and along which a fiber-optic cable (not shown) may be routed. The device 10 also includes a generally continuous and smooth inner wall 54 (see also, FIG. 5) that defines a routing channel 56 through the device 10. A fiber-optic cable may be routed on and along the inner wall 54, and through the routing channel 56 as the cable is routing from an overhead routing system, or into and out of an enclosure. The outer wall 52 and inner wall 54 provide a smooth surface over and upon which the fiber-optic cable may pass and ensure that the cable is not bent more than a predetermined amount as the cable is routed on and along the outer and inner walls 52, 54 of the device 10. A first and second channel opening 32, 34 are defined at opposite ends of the device (on a routing channel 56) and located at an ingress and egress location of the device 10 (see also, FIG. 5). It should be noted that applicants' use of the terms ingress and egress to describe the routing of a fiber-optic cable, and other similar directional terms, are used in an illustrative manner. The routing direction of a fiber-optic cable being a matter of design choice or application, and not limiting or otherwise defining the scope and spirit of the present invention.

The device 10 of the present invention also includes mounting and alignment features that facilitate mounting of one device 10 to another device 10, and that also facilitate mounting of one or more devices 10 to another structure (e.g., a trough or enclosure, as described below). A plurality of locking tabs 22 are provided peripherally about the second channel opening 34. Each tab 22 is sized and shaped to releasably secure the device 10 to another structure such as a cable trough 200, for example and as depicted in FIG. 1. Each tab 22 is preferably at least partly flexible to facilitate easy insertion of the device 10 in a suitably sized aperture (see, e.g., aperture 206 of FIG. 2). When securing the device 10 to another structure (i.e., when inserting the device 10 in a suitably sized and shaped aperture), a ramped part 26 of each tab 22 encounters a surface of the structure causing the tab 22 to deflect. The ramped part 26 slides on and along the structure as the device 10 is inserted into the aperture 206 and to the structure. Each tab 22 also comprises an insertion wall 30 having an extension 28 that together define a surface 42 for supporting the device 10 in the aperture 206. Each tab 22 also includes a locking part 44 that secures the device 10 in place in the aperture 206. Thus, when a device 10 is secured in an aperture 206, the surface 42 and locking part 44 hold the device 10 in place.

Figure 4:
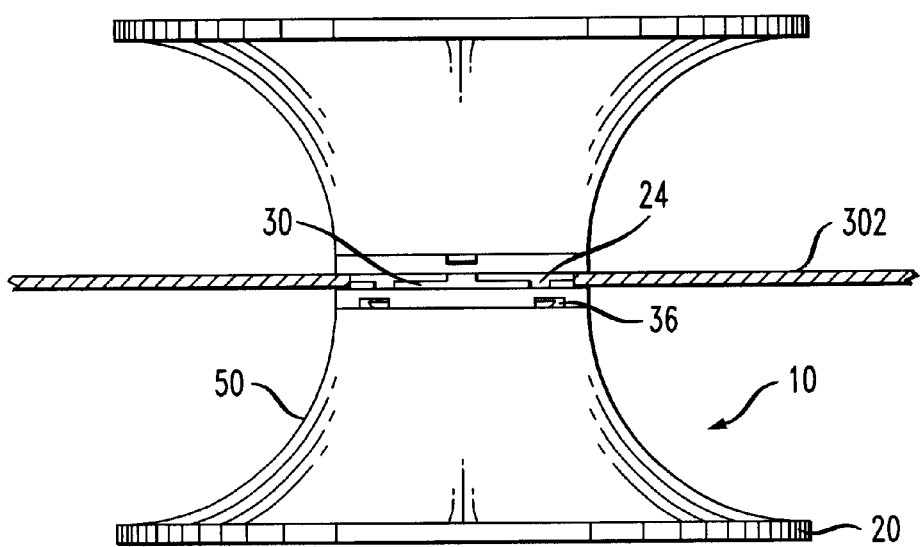
FIG. 4 is a partial cross-sectional side view of two fiber-optic cable routing and bend limiting devices connected together and on opposite sides of a side wall of an electronic enclosure.
Figure 5:
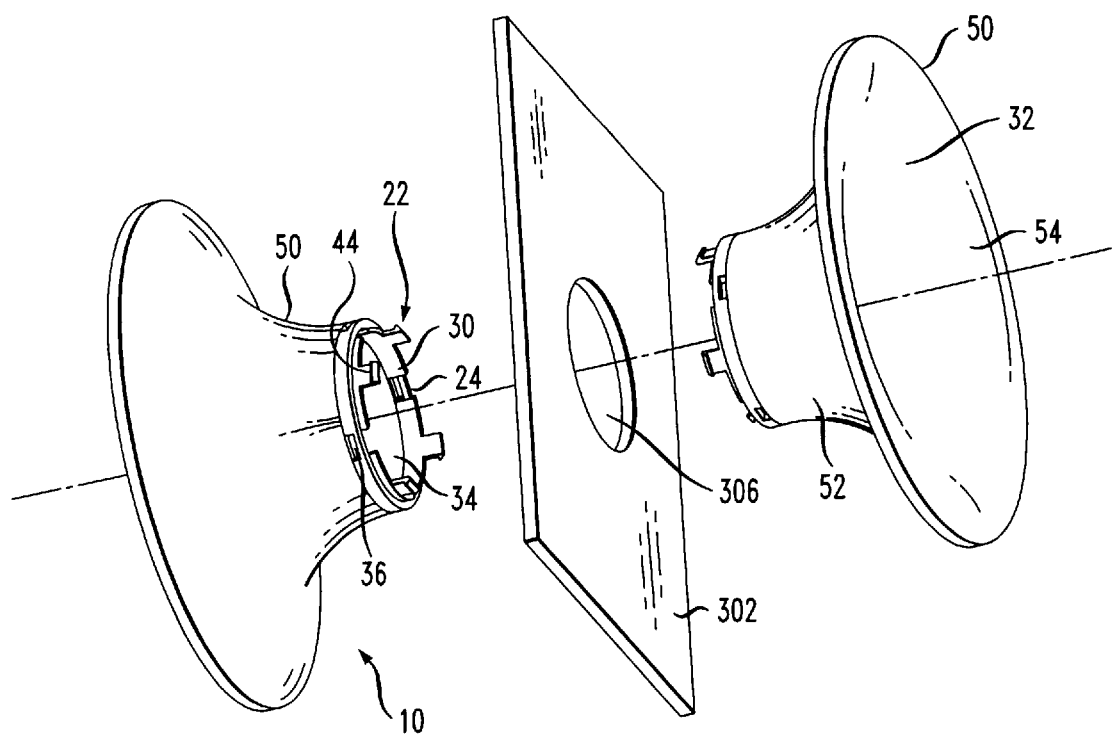
FIG. 5 is an exploded perspective view of FIG. 4.
Figure 6:
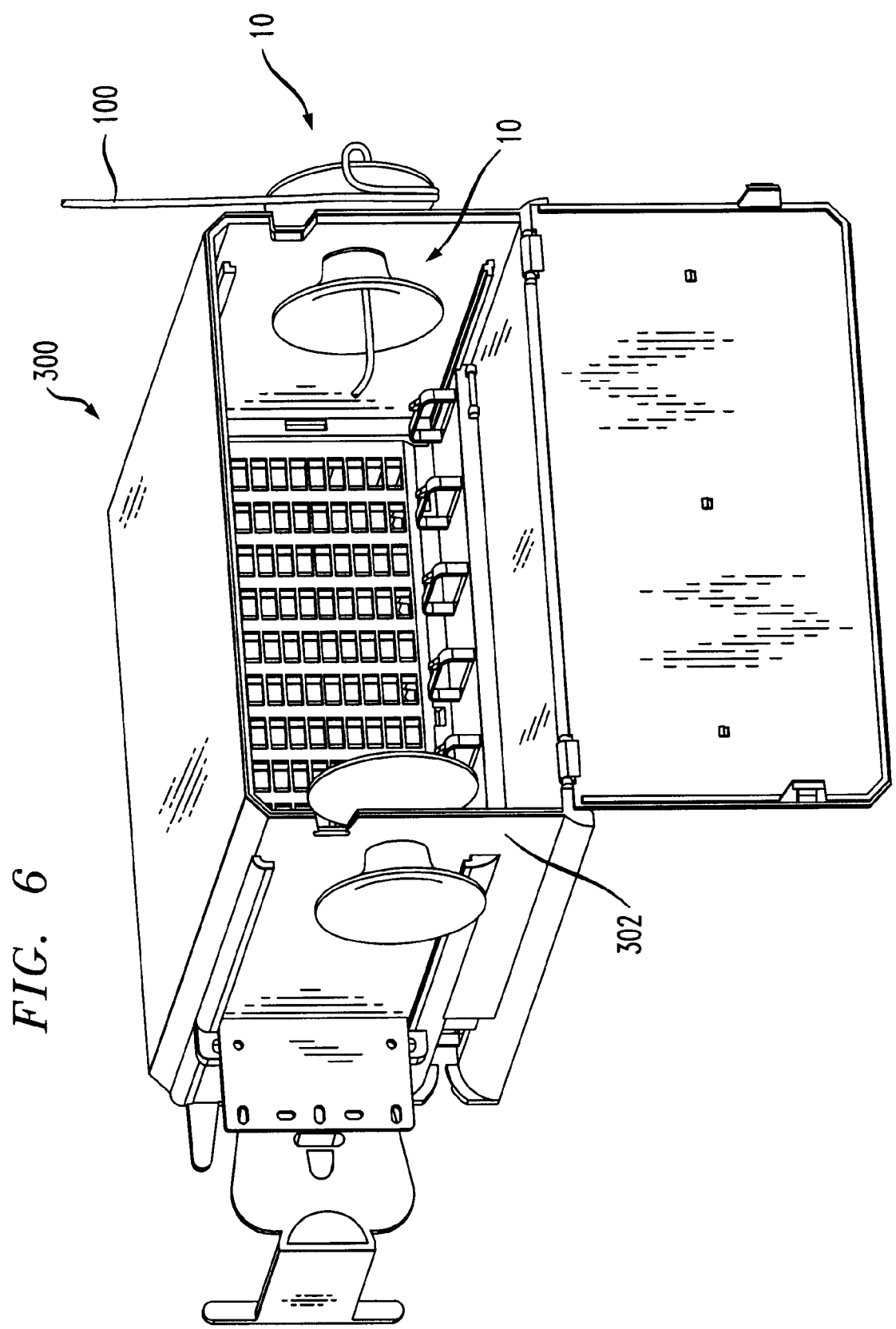
FIG. 6 is a perspective view of an electronic enclosure having two fiber-optic cable routing and bend limiting devices constructed in accordance with an embodiment of the present invention.

The inventive cable routing and bend limiting device 10 may also be used in connection with a second such device 10. With continued reference to FIG. 1 and with additional reference to FIGS. 4 and 5, another embodiment of the present invention will now be discussed. The inventive device 10 includes a plurality of tab apertures 36 disposed peripherally about the second channel opening 34 and in generally staggered relation to the locking tabs 22. Aligned generally with each tab aperture 36 is a tab recess 24. Two cable routing and bend limiting devices 10 constructed in accordance with the present invention may be secured to each other, as depicted in FIG. 4, due to the complementary design of the locking tabs 22 and tab apertures 36 and tab recesses 24. That complementary design obviates the need for different devices 10 when two devices 10 are secured together (as depicted in FIG. 6). In the embodiment depicted in FIGS. 4 and 5, the devices 10 are secured in place to a sidewall 302 of the enclosure 300 (see, e.g., FIG. 6) by the interlocking of the tabs 22 provided on each of the inventive devices 10.

Figure 2:
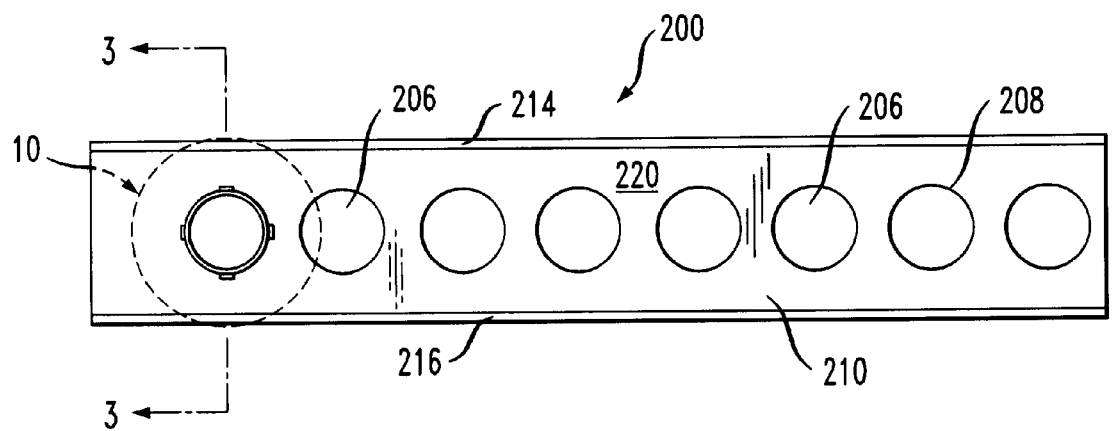
FIG. 2 is a top view of a cable trough of the fiber-optic cable routing and bend limiting system of FIG. 1.
Figure 3:
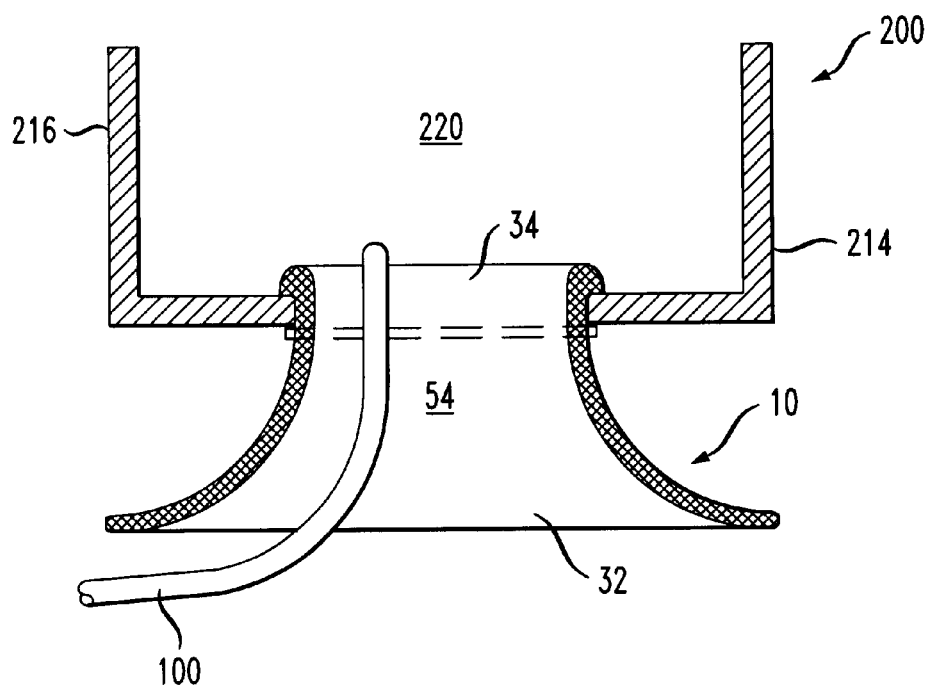
FIG. 3 is a cross-sectional view taken along line 3—3 of FIG. 2.

With reference next to FIGS. 2 and 3, a fiber-optic cable routing and bend limiting system constructed in accordance with an embodiment of the present invention will now be discussed. The inventive system of this embodiment includes a generally u-shaped cable trough 200 and a cable routing and bend limiting device 10. The trough 200 includes a base 210 having a plurality of apertures 206 defined therethrough and also defining a plurality of locations at which a device 10 may be releasably installed. Alternatively, an aperture 206 may not be defined in the base 210 but instead, a punchout 208 that may be selectively removed at a location at which a device 10 is to be installed. A punchout 208 comprises part of the base 210 that is partially severed but that remains secured to the base 210 until completely severed so as to define an aperture 206. The trough 200 includes first and second sidewalls 214, 216 that extend generally upward from the base 210 (see, e.g. FIG. 1) and are generally perpendicular thereto. The sidewalls 214, 216 and base 210 define a channel 220 longitudinally along the trough 200 through which fiber-optic cables may be routed.

The trough 200 may be mounted to a ceiling or overhead support or structure, as a matter of design choice, and using generally art-recognized mounting techniques. A plurality of troughs 200 may be arranged in any manner or configuration to suit the cable routing needs of the particular equipment room. At any desired location, as selectively defined by the location of the apertures 206 or punchouts 208, as the case may be, a cable routing and bend limiting device 10 may be secured to the trough 200, as depicted in FIG. 2. The device 10 provides a smooth transition for routing fiber-optic cables from the trough 200 to the equipment to which the fiber-optic cable connects. A fiber-optic cable 100 may be routed from the trough 200 through the second channel opening 34, on and along the inner wall 54 and routing channel 56, and out of the first channel opening 32. If desired, excess cable may be wrapped around the device 10 over the outer wall 52.

In another embodiment of the present invention, and with reference next to FIG. 6, two fiber-optic cable routing and bend limiting devices 10 constructed in accordance with the present invention may be provided on opposite sides of a sidewall 302 of an electronic enclosure 300. The two devices 10 provide a smooth transition and ensure minimum bend radius of the fiber-optic cable is maintained for ingress and egress of fiber-optic cables to the enclosure 300. As with the previously described embodiments, excess cable may be wrapped around the device 10. The two devices 10 are secured to the enclosure as depicted in FIGS. 4 and 5, and using the locking features (e.g., tabs 22, etc.) described in detail above. As depicted in FIG. 6, and as a routine matter of design choice, fiber-optic cable routing and bend limiting devices 10 may be placed on one or both sides of the enclosure 300.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A fiber-optic cable routing and bend limiting device comprising:
   a support defining a channel for guidedly receiving therein a cable;
   a routing and bend limiting device releasably secured to said support and having a wall and having routing channel defined therethrough, the cable being selectively routable over said wall and through said routing channel, said wall and routing channel limiting the bending radius of the cable to less than predetermined amount; and
   mounting and alignment features to releasably secure said device to a structure, wherein the structure comprises:
      an enclosure; and
      a second fiber-optic cable routing and bend limiting device having mounting and second alignment features complementary to said mounting and alignment features to releasably secure the second fiber-optic cable and bend limiting device to said enclosure and to said fiber-optic cable routing and bend-limiting device.

2. A fiber-optic cable routing and bend limiting system as recited by claim 1, wherein said support comprises a u-shaped trough having an aperture defined therethrough.

3. A fiber-optic cable routing and bend limiting system as recited by claim 1, wherein said support comprises a u-shaped trough having a punchout.

4. A fiber-optic cable routing and bend limiting system as recited by claim 1, wherein said routing and bend limiting device is funnel shaped and includes an outer wall and an inner wall, and wherein said routing channel is defined longitudinally through said device and defines a first and a second channel opening.

5. A fiber-optic cable routing and bend limiting system as recited by claim 2, wherein said routing and bend limiting device is releasably secured in said aperture, and wherein said routing and bend limiting device is funnel shaped and includes an outer wall and an inner wall, and wherein said routing channel is defined longitudinally through said device and defines a first and a second channel opening.

6. A fiber-optic cable routing and bend limiting system as recited by claim 3, wherein punchout is selectively removable, and when removed, an aperture is defined through said trough within which said routing and bend limiting device is releasably secured, and wherein said routing and bend limiting device is funnel shaped and includes an outer wall and an inner wall, and wherein said routing channel is defined longitudinally through said device and defines a first and a second channel opening.

7. A fiber-optic cable routing and bend-limiting device comprising:
   a body comprising:
      an outer wall;
      an inner wall defining a routing channel longitudinally trough said body, said routing channel having a first opening and a second opening defined at longitudinal ends of said body; and
   mounting and alignment features to releasably secure said device to a structure, wherein the structure comprises:
      an enclosure; and
      a second fiber-optic cable routing and bend limiting device having mounting and second alignment features complementary to said mounting and alignment features to releasably secure the second fiber-optic cable and bend limiting device to said enclosure and to said fiber-optic cable routing and bend-limiting device.

8. A fiber-optic cable routing and bend-limiting device as recited by claim 7, wherein said mounting and alignment features comprises a plurality of locking tabs located at said second opening and a plurality of apertures defined through said body near said second opening.

9. A fiber-optic cable routing and bend-limiting device as recited by claim 8, wherein each of said plurality of locking tabs comprises:
   a ramped part for sliding on and along the structure as said device is being secured to the structure;
   a locking part for securing said device to the structure; and
   a support surface for supporting said device to the structure.

10. A fiber-optic cable routing and bend-limiting device as recited by claim 7, wherein the structure comprises a second fiber-optic cable routing and bend limiting device having mounting and second alignment features complementary to said mounting and alignment features to releasably secure the second fiber-optic cable routing and bend limiting device to said fiber-optic cable routing and bend-limiting device.

11. A fiber-optic cable routing and bend-limiting device as recited by claim 7, wherein the structure comprises an enclosure.

* * * * *